United States Patent [19]

Petit et al.

[11] 4,131,607

[45] Dec. 26, 1978

[54] PROCESS FOR OBTAINING PURIFIED PROTEIN ISOLATES

[75] Inventors: Lëon Petit, Sceaux; André Davin, La Chapelle sur Erdre; Jacques Guëguen, Cachan, all of France

[73] Assignee: Institut National de la Recherche Agronomique, Paris, France

[21] Appl. No.: 625,036

[22] Filed: Oct. 23, 1975

[30] Foreign Application Priority Data

Oct. 23, 1974 [FR] France ............................... 74 35594

[51] Int. Cl.² ............................................... A23J 1/14
[52] U.S. Cl. ............................... 260/123.5; 260/112 R
[58] Field of Search ........................... 260/112 R, 123.5

[56] References Cited

U.S. PATENT DOCUMENTS

| | | | |
|---|---|---|---|
| 1,955,375 | 4/1934 | Cone et al. | 260/112 B |
| 2,415,426 | 2/1947 | Henning | 260/112 |
| 2,589,867 | 3/1952 | Rowe | 260/123.5 |
| 2,666,049 | 1/1954 | Rowe | 260/123.5 |
| 3,001,875 | 9/1961 | Sair | 260/123.5 UX |
| 3,579,496 | 5/1971 | Martinez et al. | 260/123.5 |
| 3,586,662 | 6/1971 | O'Connor | 260/123.5 |
| 3,622,556 | 11/1971 | O'Connor | 260/123.5 |
| 3,870,801 | 3/1975 | Tombs | 260/123.5 |
| 3,966,702 | 6/1976 | Carey | 260/123.5 |

OTHER PUBLICATIONS

Food Technology, vol. 24, 242, Mar. 1970, Gheyasuddin et al. - pp. 36-37.

*Primary Examiner*—Howard E. Schain
*Attorney, Agent, or Firm*—Oblon, Fisher, Spivak, McClelland & Maier

[57] ABSTRACT

The invention relates to the production of purified protein isolates.

The process of the invention comprises:
(1) making a suspension or a slurry of cake of a protein substance containing compounds having a mucilaginous consistency with a volume in 1. of 10 to 15 times and preferably 3 to 5 times, the weight in kg of press cake of a solution of one or more alkaline-earth metal comprising a magnesium salt and further containing Na sulphite, and adding to the suspension or slurry thus obtained a concentrated solution of an alkali in an amount sufficient to permit solubilization of the proteins,
(2) separating in a known manner the protein extract from the insoluble residue,
(3) acidifying the resulting clarified protein extract with an acid solution to a pH of between 4.5 and 5.5 to precipitate the proteins, and
(4) separating in a known manner from the mother-liquors the protein precipitate formed, the said protein precipitate being subsequently subjected to washing.

The protein isolates so obtained are light colored and have a nitrogen content of at least 16%.

26 Claims, No Drawings

PROCESS FOR OBTAINING PURIFIED PROTEIN ISOLATES

This invention relates to the obtention of purified protein isolates, and notably purified protein isolates obtained from protein substances having a mucilaginous consistency, and in particular sunflower seed proteins.

It is known that new sources of protein are now being sought, both to remedy the malnutrition from which more than half the world's population suffers and also to meet the requirements of new markets opening up as a result of the evolution of methods of nutrition in developped countries.

Among the new sources of proteins now used, such as vegetable products, seeweeds, bacteria, yeasts and oilseeds, notably soya, sunflower, rape and cotton, are valuable raw materials owing to their being so plentiful.

Processes are already known for obtaining proteins from sunflower seed; for example, the so-called precipitation-washing technique described, notably, by GHEYASUDDIN, CATER and MATTIL in "Food Technology" vol. 24, p. 242 (1970) may be mentioned.

This process comprises the following essential steps:
(a) subjecting the proteins contained in sunflower seed cake from which the oil has been removed to alkaline solubilization with sodium hydroxide containing sodium sulphite.
(b) clarification of the suspension so obtained by centrifugation or decantation, thus enabling the alkaline protein solution to be separated from the solid residue comprising essentially cellulose and hemicelluloses.
(c) precipation of the proteins contained in the alkaline solution by acidification at the isoelectric point, said point corresponding to the pH for which solubilization of sunflower seed proteins is minimized.
(d) purification of proteins in the insoluble form obtained in the preceeding step by washing with water, followed by centrifugations or filtrations and then by washing with alcohol-ether.

The said proteins thus isolated are dried, for example by freeze-drying or by atomization.

Dark coloured protein isolates are obtained by this process, which were found to be unsuited for extrusion, owing to the presence of substances having a mucilaginous consistency in concentrated alkaline solution, which block the dies.

Processes have also been proposed for obtaining protein substances by alkaline dissolution and treatment with lime; in this connection, U.S. Pat. Nos. 1,955,375 and 2,233,439, as well as French Pat. No. 975,022, may be mentioned. They describe processes for obtaining protein substances, notably useful for coating paper, by using steps of alkaline dissolution and treatment by lime under conditions such that the proteins obtained are denatured.

Furthermore, it is also known to prepare purified isolates of sunflower seed proteins, suited for extrusion, by treating with lime solutions of sunflower proteins obtained by alkaline dissolution and elimination of the insoluble residue; according to said process, the amount of lime used is determined so that the CaO concentration in the resulting solution is in the range of 2 to 7 g/l; the conditions for carrying out said process, described in French patent application No. 73,29327 filed on August 10, 1973, that is to say, the amount of lime used, the duration of maceration and the temperatures of treatment, are such that the products obtained are non-denatured purified protein isolates, which are useful in the nutritional field. Said process makes it possible to obtain purified protein isolates, i.e. free of the substances responsible for blocking up the dies, or substances of a mucilaginous consistency; however, said process has disadvantages, notably insofar as protein colour is concerned.

A similar process has also been proposed in U.S. Pat. No. 2,607,767; said process comprises adding to oleaginous proteinaceous vegetable residue a previously prepared aqueous mixture of sodium hydroxide and calcium chloride, the preferred $CaCl_2$ concentrations being necessarily very high and at most as high as $10 \times 10^{-2}$ M.

It is a primary object of the present invention to extract purified protein isolates free of substances of a mucilaginous consistency and weakly pigmented, thus avoiding the problems of protein colour described hereinabove.

The process of the present invention comprises:
(1) making a suspension or a slurry of cake of a protein substance containing compounds having a mucilaginous consistency with a volume in 1. of 10 to 15 times, and preferably 3 to 5 times, the weight in kg. of press cake of a solution of one or more salts or alkaline-earth metals comprising a magnesium salt and further containing sodium sulphite, and adding to the suspension or slurry thus obtained a concentrated solution of an alkali in an amount sufficient to permit solubilization of the proteins,
(2) separating in a known manner the protein extract from the insoluble residue,
(3) acidifying the resulting clarified protein extract with an acid solution to a pH of between 4.5 and 5.5 to precipitate the proteins, and
(4) separating in a known manner the protein precipitate formed from the mother liquors, the said protein precipitate being subsequently subjected to washing.

The protein substance containing compounds having a mucilaginous consistency usable according to this invention is selected from the above-mentioned sources of protein. Among these, sunflower seed proteins are more particularly preferred and, for the sake of clarity, the rest of the present description will refer to these proteins, while in no way being limited thereto.

The sunflower seed cake used in the process of this invention is advantageously ground to a mean mesh size preferably smaller than 1 mm, to facilitate rapid and stable suspension in the salt solution.

The temperature at which the process of the invention is carried out is not critical, but extraction of the soluble components is more thorough when the operation is effected at between about 15 and 50° C; however, for reasons of economy, the process of this invention may advantageously be carried out at ambient temperature, in which case the duration of the extraction step may be substantially longer.

The alkaline-earth metal salts usable in the process of the invention are notably calcium salts, such as calcium acetate, chloride, lactate, etc; said salts are used in combination with a magnesium salt, such as for example magnesium acetate, magnesium chloride, magnesium lactate or the like.

The alkaline-earth metal salt solution preferred in the process of the invention is a calcium acetate and magnesium acetate solution, and a particularly preferred solution is a solution of calcium chloride and magnesium chloride. The volume of final solution of step (1) of this process represents 10 to 15 times and advantageously 3 to 5 times the weight of the cake, the respective alkaline-earth metal salt and magnesium salt contents of said solutions being determined as a function of the components of the mucilaginous consistency contained in the starting substance, of the pigment concentration thereof and of desired purity of the final product. To solubilize the proteins, there is used, according to this invention, anyl alkali such as, for example, sodium hydroxide, potassium hydroxide or an ammonical solution.

The amount of alkali used enables the pH of the solubilizing medium to be adjusted to a value of between 10.5 and 12.5, and preferably between 11 and 12. Most preferably a concentrated alkali is used in such an amount as to give a normality of between 0.10 and 0.15 N.

In the process according to this invention, it is useful in a first phase to maintain the pH of the mixture of seed cake and salt solution to a value between about 7 and 8.5 to insolubilize the fraction of pigments obtained from the sunflower seed husks. According to a preferred embodiment of the invention, in a first phase the pH of the said suspension is therefore adjusted to a value of between 7 and 8.5, and preferably of 8, the suspension is left to macerate for about 15 to 30 minutes, the pH of the resulting solution is raised to a value of between 10.5 and 12.5, and is then left to macerate for about 15 to 30 minutes, advantageously at ambient temperature.

The amount of Na sulphite used in the solution of alkaline-earth metal salts, for example in the Ca acetate-Mg acetate solution, is such that the Na concentration in the slurry or cake suspension is between 1 and 2 9/l.

According to a preferred embodiment, the same amount of Na sulphite should be fed together with the concentrated alkali solution, in lieu of being part of the alkaline-earth metal salts solution.

The protein extract obtained after solubilization of the proteins and separation of the insoluble residue is then acidified to a pH of between 4.5 and 5.5, and preferably between 5.2 and 5.3. A concentrated solution of sulphuric or hydrochloric acid is preferably used for said acidification. However, any other acid solution may be used, such as phosphoric, acetic, lactic or citric acid, to lower the pH of the solution. This range of pH corresponds to the optimal precipiration zones of proteins and thar required for maintaining in solution the pigments which may not have been insolubilized during the previous steps of the process. The protein precipitate is then separated from the mother liquors by centrifugation or washing.

According to an embodiment of this invention particularly preferred from the commercial point of view:

(a) a slurry is formed in a solution of a Ca salt and a magnesium salt with sunflower cake ground to a mesh size preferably smaller than 1 mm, the volume of solution used being 3 to 5 times the weight of the cake, (b) there is added to the said slurry Na sulphite and a concentrated alkali, in an amount such that the normality of said alkali be finally comprised between 0.10 and 0.15 N, and the whole is left to macerate for about 15 to 30 minutes, (c) the pH of the suspension is optionally adjusted to a value of between about 10.5 and 12.5 and preferably between 11 and 12, (d) this slurry is put to macerate and it is diluted, so that the total volume in l. and the weight of seed cake in kg be in a respective ratio of 10:1 to 15:1, (e) the insoluble residue is separated from the solution, by a known means, nd the resulting solution is acidified to a pH of between 4.5 and 5.5 to precipitate the proteins, the protein precipitate then being separated from the mother-liquors by known means, such as by centrifugation or washing.

Thus, according to the process of this invention, the protein extract obtained is free of substances of a mucilaginous consistency and is weakly pigmented. Extrusion of the protein substances so prepared is therefore facilitated owing to the absence of mucilaginous substances which block the dies.

The protein precipitate obtained after acidification of the clarified protein extract is subsequently washed by being put in suspension in water, for example in a volume of water equal to that of the clarified extract. The washed proteins are then recovered by filtration, centrifugation or washing. This operation may be repeated and the final washing liquids may be reused, i.e. fed back into step (1) of the process.

The proteins thus obtained can be dried, for example, by freeze-drying, atomization or in a drying fluidized bed. In the case of drying by atomization, the temperature of the air lies in the range of 150 and 300° C and the temperature of the dry product lies between 75 and 95° C.

The purified isolates are substantially and even practically completely soluble in an alkaline medium.

The degree of purification can be assessed after the preparations have been nitrogen-enriched. Thus, a sunflower seed protein isolate prepared without purification contains from 14 to 15.5% nitrogen, whereas an isolate prepared under the same conditions but with purification contains on an average about 16%, and more often even 16.5% nitrogen, nitrogen being determined by the KJELDAHL method. The ability of protein isolates to be extruded is characterized by their solubility in sodium hydroxide. Thus, the protein isolates according to the invention are completely soluble in sodium hydroxide, whereas the protein isolates obtained by the process known as the precipitation-washing process are not completely soluble.

Without wishing to be tied down to any special theory, it is assumed that the preferred mode of embodiment of the invention, the calcium salt plays a double role : in a first phase, at pH 8, the calcium salt insolubilizes the fraction of pigments provided by the sunflower seed husks; in the second phase, during solubilization of proteins at a pH higher than 10, it insolubilizes the components having a mucilaginous consistency, very probably due to the in situ formation of lime, partly in the dissolved state and partly as a colloidal precipitate, as a result of the reaction between the alkali and the alkaline-earth metal salts.

Similarly, insofar as the magnesium salt is concerned, it is believed to induce insolubilization of a portion of the pigments containing chlorogenic acid, owing to the formation of insoluble magnesium chlorogenate.

Furthermore, the sodium sulphite is used in the process of the invention as an antioxiding agent with respect to polyphenols, and notably chlorogenic acid.

Thus, the use of a magnesium salt and sodium sulphite according to the process of the invention contributes to the production of very weakly pigmented protein isolates.

EXAMPLE 1

In this Example, all the steps were effected at ambient temperature. 10 kg of sunflower cake ground to a mesh size of about 1 mm was put in suspension in 100 liters of an acetate solution wherein 150 g of sodium sulphite had been dissolved, the acetate solution consisting of calcium acetate and magnesium acetate, the concentration of each component being 0.02 M. 10 N concentrated soda was added to this suspension until a pH of about 8 was obtained. The suspension was left to macerate with stirring for about 15 minutes. Concentrated soda was then added to obtain a normality of 0.1 N, the resulting mixture being left to macerate for 10 to 30 minutes. The protein extract was then separated from the insoluble residue. Sulphuric acid was then added to the extract thus clarified until a pH of 5 was obtaind, the precipitated proteins were then separated and washed. The washed proteins were then dried by atomization. The dry product had a 16.7% nitrogen content.

Extruding trials conducted with the proteins obtained hereinabove gave satisfactory results; no clogging of the dies occurred; furthermore, the fibers obtained had good mechanical characteristics.

EXAMPLE 2

In this Example, 10 g of sunflower seed cake was treated by the procedure described in Example 1, but replacing the calcium acetate by an equimolar amount of calcium lactate, using 10 ml of solution to form the suspension. The protein isolate thus obtained had a light colour; it had a 16.5% nitrogen content and was totally soluble in sodium hydroxide.

EXAMPLE 3

The same procedure used in Example 3 was repeated, using an equimolar amount of calcium chloride instead of the calcium lactate. The protein isolate thus obtained had a 16% N content.

EXAMPLE 4

All the steps in this Example were effected at ambient temperature.

20 g of sunflower cake, ground to a mesh size of about 1 mm, were slurried in 70 ml of a $2 \times 10^{-2}N$ calcium acetate and $1 \times 10^{-2}N$ magnesium acetate solution. The slurry was left to macerate for about 5 minutes; 0.8 ml 10 N NaOH and 10 ml of a 12 g/l sodium sulphite solution were then added to said slurry and the latter was triturated for about 15 minutes. 120 ml of a 1.5 g/l sodium sulphite solution were then added to the slurry.

The protein extract was then separated from the insoluble residue. Sulphuric acid was then added to the extract thus clarified until a pH of 5 was obtained; the precipitated proteins were then separated and washed. The washed proteins were then dried by freeze-drying. The dry product had a 16.3% nitrogen content and was totally soluble in sodium hydroxide.

What we claim is:

1. A process for obtaining purified protein isolates from protein substances containing compounds having a mucilaginous consistency which comprises:

(a) making a suspension of cake of such protein substance with a solution of a calcium salt and a magnesium salt of volume in 1. of 10 to 15 times the weight in Kg. of press cake which solution further contains sodium sulphite, (b) adding thereto a concentrated solution of alkali in amount sufficient to solubilize the proteins in said press cake, (c) separating the protein extract from the insoluble residue, (d) acidifying the protein extract obtained with an acid solution at a pH between 4.5 and 5.5 to precipitate the proteins, (e) separating the protein precipitate from the mother liquor, (f) washing the protein precipitate and recovering the protein isolate.

2. A process according to claim 1 wherein the alkaline earth metal salt solution comprises a calcium salt selected from the group consisting of calcium acetate, calcium lactate, and calcium chloride and a magnesium salt selected from the group consisting of magnesium acetate, magnesium lactate and magnesium chloride.

3. A process according to claim 1, wherein the protein substance containing compounds having a mucilaginous consistency is sunflower seed.

4. A process according to claim 1, wherein the alkali is selected from the group consisting of sodium hydroxide, potassium hydroxide and an ammoniacal solution.

5. A process according to claim 1, wherein, to acidify the protein extract, there is used a solution selected from the group consisting of a normal sulphuric acid solution, a normal hydrochloric acid solution and a solution of another acid making it possible to lower the pH of the protein extract to a value of between 4.5 and 5.5.

6. A process according to claim 5, wherein the said solution is selected from the group consisting of a phosphoric acid solution, an acetic acid solution, a lactic acid solution or a citric acid solution.

7. A process according to claim 1, which further comprises drying the washed protein precipitate.

8. A process according to claim 1, wherein the sodium sulphite is used in amounts such that the concentration of Na sulphite in the mixture is between 1 and 2 g/l.

9. A process according to claim 1, wherein the Na sulphite is fed together with the concentrated alkali solution.

10. A process for producing purified sunflower seed protein isolates, which comprises:

(a) forming a suspension in a solution of a Ca salt and a magnesium salt further containing a sodium sulphite with sunflower cake ground to a mesh size smaller than 1 mm, the volume in 1 of solution used being 10 to 15 times the weight in kg of the cake;

(b) adding to the said suspension an alkali in an amount such that the pH of said suspension is between 7 and 8.5, and leaving the mixture to macerate for about 15 to 30 minutes with stirring;

(c) adjusting the pH of the suspension to a value between 10.5 and 12.5, (d) leaving the solution obtained in (c) to macerate with continuous or intermittent stirring;

(e) separating the insoluble residue from the solution, and acidifying the resulting solution to a pH of between 4.5 and 5.5 to precipitate the proteins, the proteins precipitated being then separated from the mother-liquor.

11. A process according to claim 10, wherein the calcium salt and/or magnesium salt is selected from the group consisting of lactate, acetate and chloride.

12. A process according to claim 1, wherein the said steps are carried out at a temperature in the range of about 15 to 50° C.

13. A process according to claim 1, wherein the said steps are carried out at ambient temperature.

14. A process according to claim 10, wherein the said steps are carried out at ambient temperature.

15. A process according to claim 3, wherein the sunflower seed cake is ground to a mean mesh size substantially smaller than 1 mm.

16. A process according to claim 10, wherein the alkali is selected from the group consisting of sodium hydroxide, potassium hydroxide and an ammoniacal solution.

17. A process according to claim 10, wherein, to acidify the protein extract, there is used a solution selected from the group consisting of a normal sulphuric acid solution, a normal hydrochloric acid solution and a solution of another acid making it possible to lower the pH of the protein extract to a value of between 4.5 and 5.5.

18. A process according to claim 17, wherein the said solution is selected from the group consisting of a phosphoric acid solution, an acetic acid solution, a lactic acid solution or a citric acid solution.

19. A process according to claim 10, which further comprises drying the precipitated proteins.

20. A process according to claim 10, wherein the sodium sulphite is used in amounts such that the concentration of Na sulphite in the mixture is between 1 and 2 g/l.

21. A process according to claim 10, wherein the Na sulphite is fed together with the concentrated alkali solution.

22. A process for obtaining purified sunflower seed protein isolates, which comprises:
    (a) forming a slurry in a solution of a calcium salt and a magnesium salt with sunflower cake ground to a mesh size smaller than 1 mm, the volume of solution in 1. being 3 to 5 times the weight in kg of the cake;
    (b) adding to said slurry sodium sulphite and a concentrated alkali in an amount such that the normality of said alkali be between 0.10 and 0.15 N, and leaving the mixture to macerate for about 15 to 30 minutes with stirring;
    (c) adjusting the pH of the solution to a value between 10.5 and 12.5;
    (d) leaving the solution obtained in (c) to macerate with continuous or intermittent mixing;
    (e) separating the insoluble residue from the solution and acidifying the resulting solution to a pH of between 4.5 and 5.5 to precipitate the proteins and then separating the precipitated proteins from the mother liquor.

23. A process according to claim 22 wherein the pH of the alkali suspension is adjusted to a pH between 11 and 12.

24. A process according to claim 22, wherein the alkali is selected from the group consisting of sodium hydroxide, potassium hydroxide and an ammoniacal solution.

25. A process according to claim 22, wherein the acidification is carried out with a solution of acid selected from the group consisting of normal hydrochloric acid solution, normal sulphuric acid solution, phosphoric acid solution, acetic acid solution, lactic acid solution and citric acid solution to lower the pH of the protein extract to a value between 4.5 and 5.5.

26. A process according to claim 22, wherein the separated protein precipitate is washed and dried.

* * * * *